United States Patent
Bracken et al.

(10) Patent No.: US 12,487,209 B2
(45) Date of Patent: *Dec. 2, 2025

(54) IDENTIFYING MATERIAL USED IN WATER PIPES USING ACOUSTIC WAVE ANALYSIS

(71) Applicant: Solinas Technologies Inc., Oakville (CA)

(72) Inventors: Marc Bracken, Oakville (CA); Antonio Laranjo Da Costa, Oakville (CA); William Philip Maize, Oakville (CA); Declan Bracken, Oakville (CA)

(73) Assignee: Solinas Technologies Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,557

(22) Filed: Apr. 16, 2024

(65) Prior Publication Data

US 2024/0402140 A1     Dec. 5, 2024

Related U.S. Application Data

(63) Continuation of application No. 18/332,071, filed on Jun. 9, 2023, now Pat. No. 12,000,801.

(30) Foreign Application Priority Data

Jun. 2, 2023    (CA) ................................ CA 3201679

(51) Int. Cl.
    *G01N 29/46*     (2006.01)
    *G01N 29/04*     (2006.01)
    *G01N 29/28*     (2006.01)

(52) U.S. Cl.
    CPC ............. *G01N 29/46* (2013.01); *G01N 29/04* (2013.01); *G01N 29/28* (2013.01); *G01N 2291/023* (2013.01); *G01N 2291/106* (2013.01)

(58) Field of Classification Search
    CPC ........ G01N 29/46; G01N 29/04; G01N 29/28; G01N 2291/023; G01N 2291/106;
(Continued)

(56) References Cited

U.S. PATENT DOCUMENTS

| | | | | |
|---|---|---|---|---|
| 3,021,866 A | * | 2/1962 | Handley | ................ F16K 17/04 |
| | | | | 251/65 |
| 7,832,076 B2 | * | 11/2010 | Fischer | ................... F16L 19/04 |
| | | | | 29/890.144 |

(Continued)

FOREIGN PATENT DOCUMENTS

| KR | 102 534 828 B1 | 5/2023 |
|---|---|---|
| WO | 2023/060003 A1 | 4/2023 |
| WO | 2024/177834 A1 | 8/2024 |

OTHER PUBLICATIONS

Extended European Search Report for International Patent Application No. EP24178152.5, dated Oct. 17, 2024, (10 pages).

*Primary Examiner* — Jacques M Saint Surin
(74) *Attorney, Agent, or Firm* — Hartman Global IP Law; Gary M. Hartman; Domenica N.S. Hartman

(57) ABSTRACT

A method for identifying a material of a water pipe buried below ground is provided. The method includes generating controlled vibrations in the water pipe using a vibration exciter, and detecting a vibration response associated with the water pipe in response to the controlled vibrations using a vibration transducer in vibrational communication with the water pipe. The method further includes analyzing and processing the vibration response using a vibration signal analyzer to identify the material of the water pipe based on a comparison of the processed vibration response of the water pipe to a known vibration response of a known water pipe material.

20 Claims, 7 Drawing Sheets

(58) Field of Classification Search
CPC .... G01N 29/12; G01N 29/14; G01N 29/4427; G01N 29/045; G01M 3/243
USPC .......................................................... 73/628
See application file for complete search history.

(56) References Cited

U.S. PATENT DOCUMENTS

| | | | | |
|---|---|---|---|---|
| 9,151,023 | B2* | 10/2015 | Taylor | C02F 1/006 |
| 9,957,697 | B2* | 5/2018 | Taylor | G05B 19/05 |
| 10,145,820 | B2* | 12/2018 | Sjoblom | G01N 29/07 |
| 12,000,801 | B1* | 6/2024 | Bracken | G01N 29/28 |
| 2006/0208213 | A1* | 9/2006 | Turnau, III | F16K 5/0414 |
| | | | | 251/309 |
| 2017/0254782 | A1 | 9/2017 | Sjoblom | |

* cited by examiner

IDENTIFYING MATERIAL USED IN WATER PIPES USING ACOUSTIC WAVE ANALYSIS

CROSS REFERENCE TO RELATED APPLICATIONS

This is a continuation patent application of co-pending U.S. patent application Ser. No. 18/332,071 filed Jun. 9, 2023, which claims the benefit of Canadian Patent Application No. 3,201,679 filed Jun. 2, 2023. The contents of these prior patent documents are incorporated herein by reference.

FIELD OF INVENTION

The present disclosure is directed to identifying material used in water pipes using acoustic wave analysis. More particularly, the present disclosure is directed to identifying lead service pipes using acoustic wave analysis.

BACKGROUND

The background section provided herein is intended to introduce the reader to various aspects of the present disclosure and to various aspects of art that may be relevant to the present disclosure. This discussion is believed to be helpful in providing the reader with background information to facilitate a better understanding of the various aspects of the present disclosure. Accordingly, it should be understood that these statements are to be read in this light and not as admissions of prior art.

In municipal water distribution systems, water is delivered through a distribution network that includes transmission mains, distribution mains, and service pipes. The large diameter transmission mains, typically 600 to 1500 mm in diameter, supply water to the distribution mains that are typically 100 to 300 mm in diameter. The distribution mains convey water to the smaller service pipes, typically 18 to 25 mm in diameter, that in turn supply water to individual homes, businesses, and other buildings. In the late 1800's to mid-1900's, lead (Pb) was commonly used in the manufacture of service pipes. Over the years, a passivation layer may have formed on many of these lead pipes that may lower the amount of lead that will be released into the water. However, while a passivation layer can help reduce the risk of lead contamination, it's not a guaranteed or permanent solution. The layer can be disrupted by changes in water chemistry, physical disturbances, or other factors. For this reason, lead pipes are generally recommended to be replaced whenever possible, especially in systems providing drinking water. Galvanized steel pipes, widely used in the early 1900s, are also another long-term source of lead as the "galvanized" surface zinc coating may contain up to 2% lead.

In recent years, changes in water chemistry have led to public health emergencies, such as the one in Flint, Michigan, further highlighting the need to have lead removed from water systems. However, a utility wishing to replace lead and galvanized steel service pipes may not have complete records of which services contain lead or galvanized steel, and which have been replaced. To further complicate matters, water services often fall under the responsibility of multiple entities. For instance, the utility company may be responsible for service up to the property line and the home owner may be responsible for service pipes from the property line to the home. Therefore, while some of the services may be entirely lead, many will also consist of a combination of lead and copper, where the home owner may have replaced their section of the service pipe, or where the municipality may have replaced a portion of their service during a spot repair or watermain replacement, but did not excavate the entire section due to other constraints.

The utilities, therefore, often need to undertake identification programs in order to identify the water service pipes that need to be replaced. One current method for identifying lead and galvanized steel service pipes requires gaining entrance to the home and performing a visual inspection and a water sampling program followed by laboratory testing. Newer methods also include using testing devices that are inserted inside the service pipe to test electrical resistivity, which is highly intrusive to the homeowner. However, a major disadvantage of this method is that it requires access to the inside of the house, which is often difficult to arrange with occupants of homes. Additionally, the results of this testing method would be dominated by the response of the pipe that is closest to the sensor, which is a problem when the water service pipe may include multiple materials. Therefore, this method would not necessarily allow the identification of lead pipe if the homeowner's side is a different material such as copper. Thus, utilities must obtain cooperation from, and coordinate with the homeowner to advance the identification or detection of lead service pipes, thereby restricting the ability of the utility to proactively build a scaled replacement program.

The utilities require a simple and accurate method that can non-intrusively identify the service pipe material, and in particular, identify lead service pipes.

BRIEF SUMMARY

The present disclosure is directed to identifying material used in water pipes using acoustic wave analysis. More particularly, the present disclosure is directed to identifying lead service pipes using acoustic wave analysis.

In one aspect, a method for identifying a material of a water pipe buried below ground includes generating controlled vibrations in the water pipe using a vibration exciter, and detecting a vibration response associated with the water pipe in response to the controlled vibrations using a vibration transducer in vibrational communication with the water pipe. The method further includes analyzing and processing the vibration response using a vibration signal analyzer to identify the material of the water pipe based on a comparison of the processed vibration response of the water pipe to a known vibration response for a known water pipe material. The water pipe material may be one of lead, copper, galvanized steel, and plastic.

In one aspect, the water pipe is connected to a curb stop shut-off valve, and the method further includes generating the controlled vibrations in the water pipe through the curb stop shut-off valve. In a further aspect, the controlled vibrations are generated through a curb stop key coupled to the curb stop shut-off valve.

In one aspect, the method may also include turning off the vibration exciter prior to the vibration transducer detecting the vibration response associated with the water pipe at the curb stop shut-off valve. In another aspect, the method may also include detecting the vibration response associated with the water pipe through the ground with a vibration transducer mounted on the ground above the water pipe. In a further aspect, the vibration transducer is one of a plurality of vibration transducers spaced apart and positioned on the ground above the water pipe along a length thereof.

In one aspect, analyzing and processing the vibration response includes identifying at least one of a resonant frequency, a damping factor, a Q-factor, and harmonics of the water pipe. In one aspect, analyzing and processing the vibration response includes converting the vibration response from a time-domain response to a frequency-domain response by applying a Fourier transform algorithm, analyzing the frequency-domain response to identify at least one dominant peak, and identifying a frequency associated with the at least one dominant peak as a resonant frequency of the water pipe, In a further aspect, identifying the material of the water pipe includes comparing the resonant frequency of the water pipe to a known or predetermined resonant frequency for the known water pipe material. In another aspect, identifying the material of the water pipe is based on a comparison of a harmonic excitation response of the water pipe with a known harmonic excitation response of the known water pipe material.

In one aspect, the vibration exciter generates controlled vibrations using a swept sine wave that continuously increases in frequency from 200 Hz to 10000 Hz. In another aspect, the vibration exciter generates controlled vibrations at a series of discrete frequencies.

In one aspect, the water pipe is configured to supply water from a water main to a building, the water pipe being located between the water main and the building, and the vibration transducer being positioned on the ground above the water pipe between the water main and the building.

In one aspect, a system for identifying the composition of a water pipe buried below ground includes a vibration exciter configured to generate controlled vibrations in the water pipe, at least one vibration transducer configured to detect a vibration response associated with the water pipe in response to the controlled vibrations, and a vibration signal analyzer coupled to the at least one vibration transducer and configured to analyze and process the vibratory response, and further configured to identify a material of the water pipe based on a comparison of the processed vibration response of the water pipe to a known or predetermined vibration response for a known water pipe material.

In one aspect, the water pipe is connected to a curb stop shut-off valve, and the vibration exciter is configured to generate the controlled vibrations in the water pipe through the curb stop shut-off valve. In a further aspect, the vibration exciter is configured to generate the controlled vibrations through a curb stop key coupled to the curb stop shut-off valve.

In one aspect, the vibration exciter is turned off prior to the at least one vibration transducer detecting the vibration response associated with the water pipe at the curb stop shut-off valve. In another aspect, the at least one vibration transducer is mounted on the ground above the water pipe, and the at least one vibration transducer detects the vibration response associated with the water pipe through the ground.

In one aspect, analyzing and processing the vibration response includes calculating at least one of a resonant frequency, a damping factor, a Q-factor, and harmonics of the water pipe. In one aspect, the vibration signal analyzer is configured to convert the vibration response from a time-domain response to a frequency-domain response by applying a Fourier transform algorithm, analyze the frequency-domain response to identify at least one dominant peak, and identify a frequency associated with the at least one dominant peak as a resonant frequency of the water pipe. In a further aspect, identifying the material of the water pipe includes comparing the resonant frequency of the water pipe to a known or predetermined resonant frequency for the known water pipe material. In another aspect, the vibration signal analyzer is configured to identify the material of the water pipe based on a comparison of a harmonic excitation response of the water pipe with a known harmonic excitation response of the known water pipe material.

In one aspect, the water pipe is configured to supply water from a water main to a building, where the water pipe is located between the water main and the building, and where the at least one vibration transducer is positioned on the ground above the water pipe between the water main and the building.

In one aspect, a method for identifying service pipes containing lead in a utility includes generating controlled vibrations at at least one service pipe of the plurality of service pipes buried below ground using a vibration exciter in vibrational communication with a curb stop shut-off valve connected to the at least one service pipe, detecting a vibration response associated with the at least one service pipe using at least one vibration transducer in vibrational communication with the at least one service pipe, analyzing and processing the vibration response associated with the at least one service pipe using a real time analyzer, comparing the processed vibration response associated with the at least one service pipe to a known vibration response of a lead service pipe to determine whether the at least one service pipe contains lead, and storing the processed vibration response for each of the plurality of service pipes in a remote database for further analysis to identify all the service pipes containing lead for future replacement action planning by the utility.

BRIEF DESCRIPTION OF THE SEVERAL VIEWS OF THE DRAWINGS

Exemplary non-limiting embodiments are described with reference to the accompanying drawings in which.

DETAILED DESCRIPTION

Figure 1A:
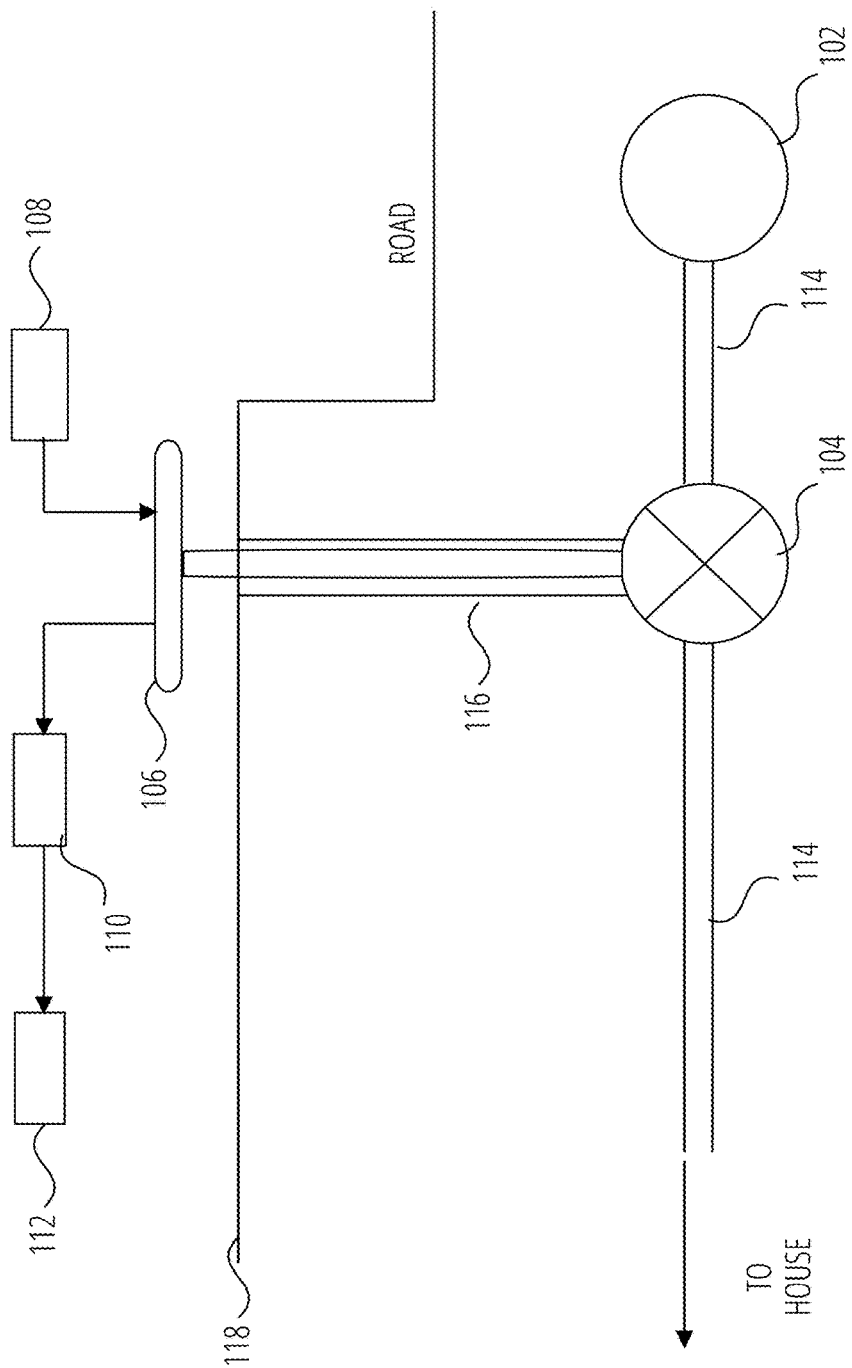
FIG. 1A illustrates a system for identifying service pipe material in accordance with one embodiment.

The present disclosure is directed to identifying material used in water pipes using acoustic wave analysis. More particularly, the present disclosure is directed to identifying lead service pipes using acoustic wave analysis.

Aspects of the present disclosure include a system and method for non-intrusively identifying the material of water service pipe. A service pipe or a service line refers to a water pipe that connects a water main to a curb stop shut-off valve and/or a water pipe that runs from the curb stop shut-off valve to a house or building. Different sections of the service pipe may fall under either the water utility's responsibility of the homeowner's responsibility based on the location of the service pipe. The property line to the house or building is usually the boundary between the water utility's responsibility and the homeowner's responsibility. The curb stop shut-off valve, or simply a curb stop, refers to a valve used in a water supply system to control the flow of water from the water main to a property's service line. This valve is usually located near the property line or curb, and is typically housed in a small enclosure known as a curb box, which is accessible from the surface. The operation of the curb stop shut-off valve generally requires a specialized tool known as a curb stop key or curb stop wrench, which can open or close the valve. The curb stop key refers to a long, slender metal rod with a handle at one end and a specialized fitting at the other end that is designed to fit over the curb stop shut-off valve. The curb stop key is long enough to reach down into the curb box (which can be several feet deep) and turn the curb stop shut-off valve without needing to excavate it.

The present method for identifying the material of service pipes uses excitation of the water service pipe off the water main, either through the curb stop shut-off valve or at alternate access points that would provide physical access to the service pipe, while measuring the response at the valve itself, or on the ground between the curb stop shut-off valve and either the home or water main. Acoustics signals are induced in the service pipe at specific resonant frequencies, for instance of lead, copper, and galvanized steel to excite the service pipe, and the resultant acoustic response of the service pipe is measured. This resultant acoustic response can be measured by one or more vibration transducers placed at the curb stop shut-off valve or on the ground above the service pipe. The acquired acoustic response data includes amplitude, time and frequency acoustic data characteristics and is analyzed by performing a number of signal processing techniques including Fourier Transform and Impulse Response Analysis. Fourier Transform can be used to transform a signal from the time domain into the frequency domain to provide a representation of the signal in terms of its constituent frequencies, thereby allowing the frequency content of the signal to be analyzed. Fourier Transform can be used in Impulse Response Analysis to obtain information about the system's characteristics, such as its stability, damping, and frequency response. The composition of the pipe or the identity of the pipe material can then be inferred from the processed response data, including one or more of resonant frequencies of the excited pipe, damping or decay of the excited pipe, Q-factor or the sharpness of the resonant peak, and the presence or absence of harmonics in the excited pipe.

Figure 1B:
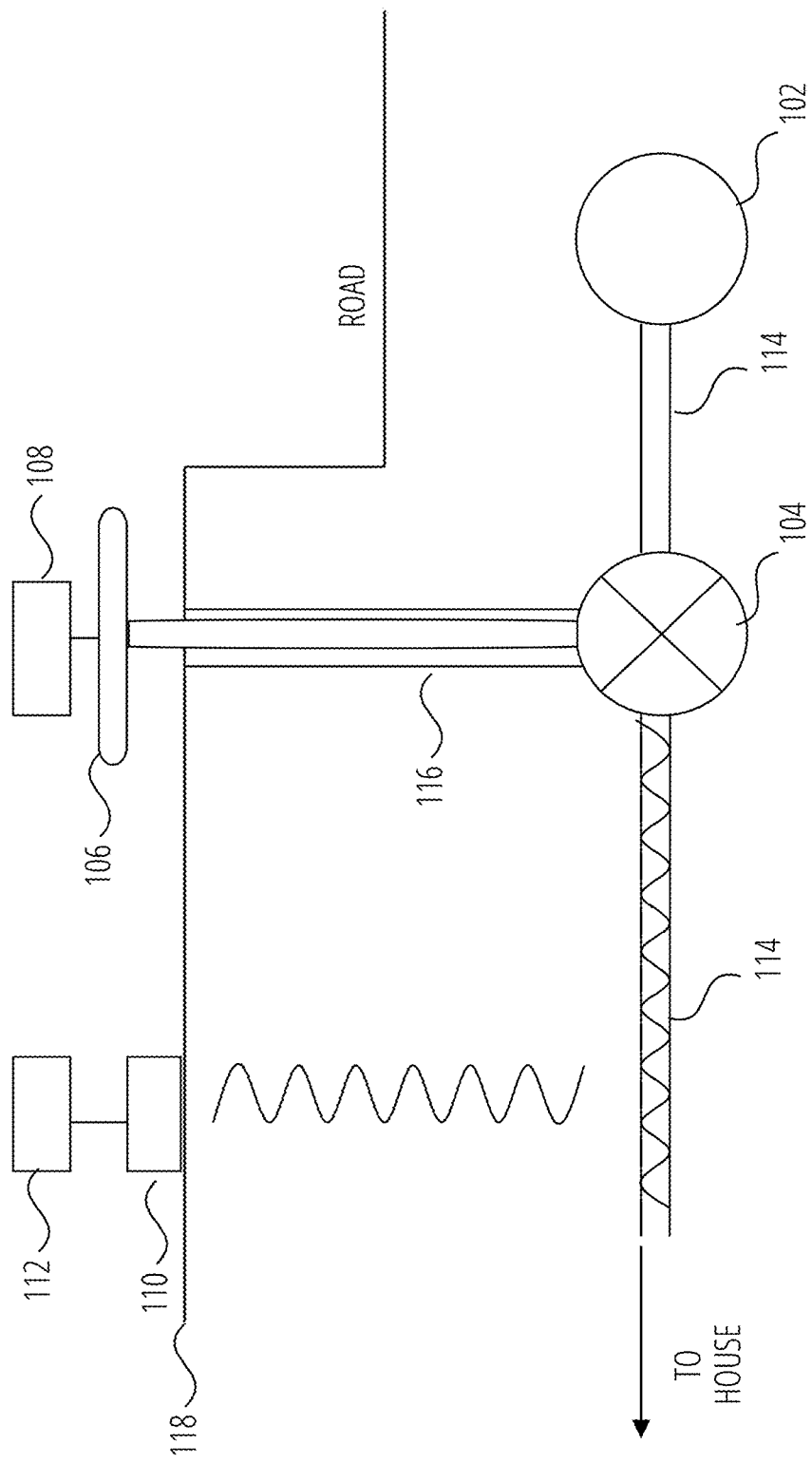
FIG. 1B illustrates a system for identifying service pipe material in accordance with another embodiment.

FIGS. 1A and 1B illustrate two embodiments of a field set-up of a portable system for identifying buried service pipe material. Identical elements in FIGS. 1A and 1B have been given the same reference numerals.

FIGS. 1A and 1B illustrate water supplied to a house or building from the water mains 102 via the curb stop shut-off valve 104 through service pipe 114. The curb stop shut-off valve 104, also known as a curb stop or service stop, is a valve used in water utility systems to control the flow of water from the water main 102 to individual properties. It serves as the primary shut-off point for a property's water service and is typically located near the property line or in the vicinity of the curb. The curb stop shut-off valve 104 is housed in a small enclosure known as a curb box 116. The curb box 116 may be several feet deep underground, but is accessible from the ground 118. The curb stop shut-off valve 104 can be operated with a specialized wrench or key, known as the curb stop wrench or the curb stop key 106. The curb stop key 106 is designed to fit the specific shape and size of the curb stop shut-off valve access point, allowing the curb stop shut-off valve 104 to be turned on or off. The curb stop key 106 is typically made of durable materials like steel.

A buried service pipe 114 supplies water from water main 102 via the curb stop shut-off valve 104 to the house. The buried service pipe 114 can be made of different materials including lead, copper, or galvanized steel. The apparatus for identifying the type of material used in the service pipe 114 includes a vibration exciter 108, a vibration transducer 110, and a vibration signal analyzer 112.

The vibration exciter 108 refers to a device that generates controlled vibrations. A vibration exciter, also referred to as a vibration shaker, can create vibrations across a range of frequencies and amplitudes. Vibration exciters work by using an electromechanical mechanism to convert electrical energy into mechanical vibrations. One non-limiting example of a vibration exciter is the electrodynamic shaker, which uses a coil in a magnetic field to create force. When an electrical signal is applied to the coil, it moves in the magnetic field and creates a force that is transferred to the structure being vibrated. The vibration exciter 108 is configured to be positioned in vibrational communication with the service pipe 114 through one or more access points. In one aspect, the access point may include the curb stop shut-off valve 104. Alternately, an access point can be created by using hydrovac excavation to gain access to the service pipe 114 buried underground between the water main 102 and the house. In a further aspect, the access point can be any location from where the vibration exciter 108 is able to be in vibrational communication with the service pipe 114 extending between the water main 102 and the house.

In one aspect, the vibration exciter 108 is configured to generate controlled vibrations at the curb stop shut-off valve 104 through the curb stop key 106. These vibrations cause the service pipe 114 to resonate at its natural frequencies depending on the material the service pipe 114 is made of. In one aspect, the vibration exciter 108 can generate a swept sine wave vibration that continuously increases in frequency from 200 Hz to 10000 Hz. In another aspect, the vibration exciter 108 can generate controlled vibrations at a series of discrete frequencies, and the fundamental frequency can be determined by iteration using a simple iteration algorithm or a finite difference algorithm. In still another aspect, broadband noise can be used to generate the controlled vibration. However, broadband noise may be noisy and less efficient when compared to a swept sine wave vibration.

A vibration transducer 110 can be used to detect the vibration response associated with the service pipe 114 in response to the controlled vibrations generated by the vibration exciter 108. The vibration transducer 110, also referred to as a vibration sensor, is a device that converts mechanical vibrations into an electrical signal that can be measured and analyzed. The vibration response or acoustic signals propagated from the service pipe 114 can be measured either on the ground above the service pipe 114 or on the pipe itself through the curb stop shut-off valve 104.

In one embodiment, as shown in FIG. 1A, the vibration transducer 110 is positioned in vibrational communication with the curb stop shut-off valve 104 and/or the service pipe 114 to detect and measure the vibration response associated with the service pipe 114 through the curb stop shut-off valve 104. When the vibration transducer 110 is positioned to measure the vibration response at the curb stop shut-off valve 104, the vibration exciter 108 is turned off prior to measuring the vibration response or acoustic signals at the curb stop shut-off valve 104 with the vibration transducer 110.

In another embodiment, as shown in FIG. 1B, the vibration response or acoustic signals can be measured on the ground above the pipe by positioning the vibration transducer 110 on the ground above the buried service pipe 114 between the curb stop shut-off valve 104 and house. The vibration transducer 110 is positioned on the ground above the service pipe 114 to be in vibrational communication with the service pipe 114. It should be understood that the vibration transducer 110 could in another embodiment be located on the ground above the buried service pipe 114 between the curb stop shut-off valve 104 and the water main 102.

While FIG. 1B illustrates a single vibration transducer 110, it should be understood that a plurality of vibration transducers 110 can be positioned on the ground 118 above the pipe along a length thereof. The vibration transducer 110 can measure or sense vibrations in the service pipe 114 by converting the mechanical vibrations into electrical signals that can be further analyzed or monitored. While various types of sensors can be used as vibration transducer 110, an accelerometer, for instance, a piezoelectric accelerometer, is generally used as vibration transducer 110. The vibration transducer 110 can be mounted on the ground above the service pipe using ground mounts (not shown). In one aspect, the ground mounts for the vibration transducer 110 can be designed with specific frequencies to amplify the signal from the service pipe 114. For instance, the ground mounts can be designed to have resonant frequencies that match the resonant frequencies of common service pipe materials to provide mechanical gain to the vibration signals being measured from the pipe. This helps amplify the vibrations at the resonant frequencies by increasing the signal to noise ratio, and making the vibrations easier to detect and measure.

As shown in FIGS. 1A and 1B, the vibration transducer 110 is coupled to a vibration signal analyzer 112 for signal processing and analysis. A vibration signal analyzer 112 is a device that measures and displays the frequency spectrum or the amplitude of a signal as a function of frequency. In one aspect, the vibration signal analyzer 112 includes a data acquisition system for obtaining vibration signals from the vibration transducers 110. The vibration signals may be processed and analyzed using either MATLAB or software within the data acquisition system. In another aspect, the vibration signal analyzer 112 is a real-time analyzer which can analyze and process the vibration signals from the vibration transducer 110 in real-time. The real-time analyzer can be a hardware device, or it can be a software application running on a computer, tablet, smartphone, or the cloud. Fast Fourier Transform (FFT) analyzers are one type of real-time analyzers that can be used to analyze the vibration response of the service pipe 114 in real-time. FFT analyzers use an FFT algorithm to provide a detailed analysis of the obtained signal data. The FFT algorithm can be used to convert the time-domain vibration signal into the frequency domain and identify the frequencies present in the measured vibration data and analyze their magnitudes.

Figure 2:
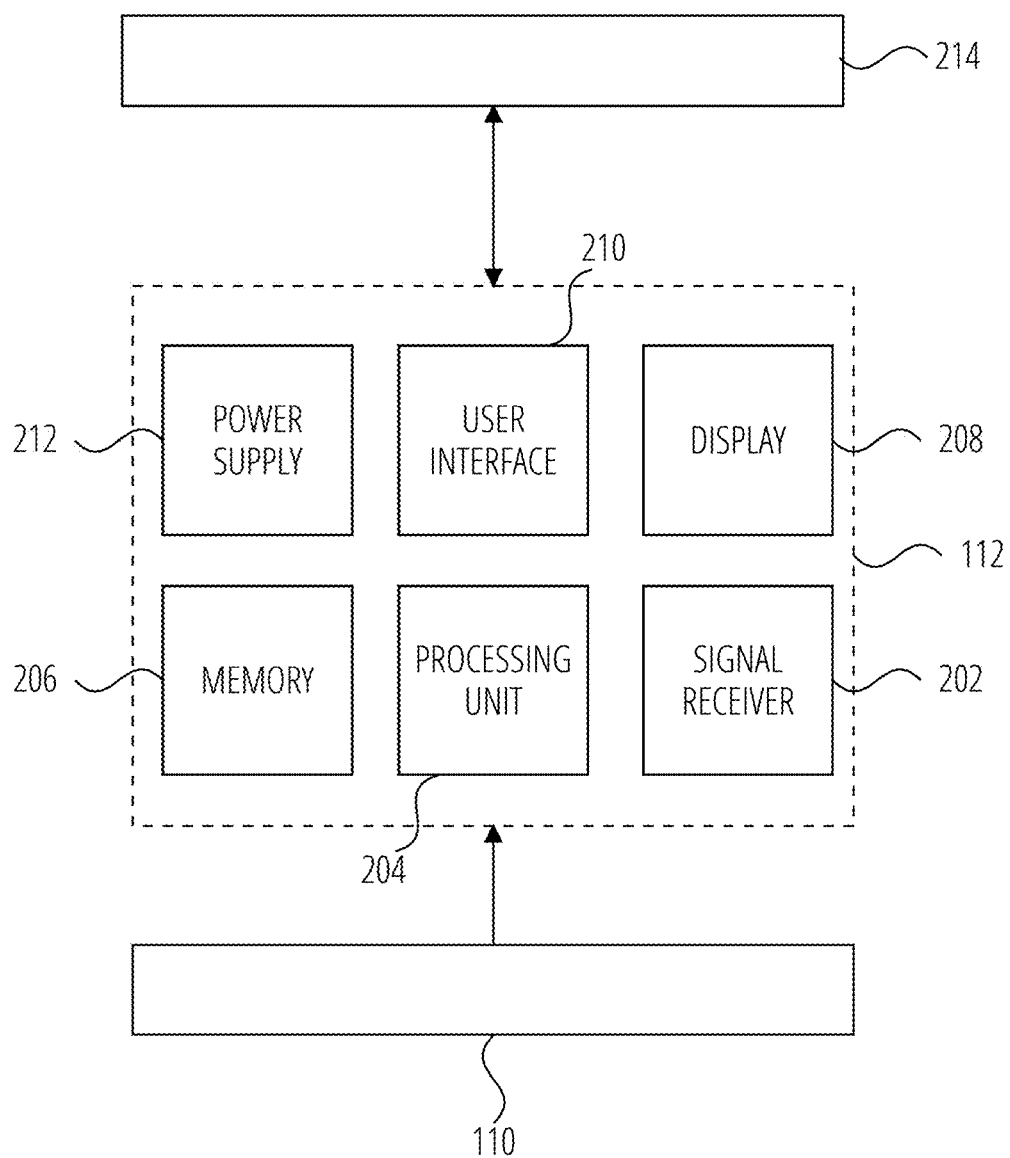
FIG. 2 illustrates a schematic representation of a vibration signal analyzer of FIGS. 1A and 1B according to one aspect.

FIG. 2 illustrates a schematic representation of a vibration signal analyzer 112 of FIGS. 1A and 1B according to one aspect. The vibration signal analyzer 112 may be in the form of a stand-alone computing device or may be integrated within a multi-purpose computing device, or may be partly or fully embodied in a cloud computing environment. The vibration signal analyzer, in one aspect, may collect data relating to the measured resonant frequencies and download this data to a computer application or upload to a cloud system where the analysis is completed either in real-time or at a later time. Thus the vibrational signal analysis may be conducted partially or fully either on-site or off-site from the location where the vibrational response is being measured. Accordingly, components of the vibration signal analyzer 112 may be located in the same or multiple locations and be communicatively coupled. In one aspect, the vibration signal analyzer 112 is a real-time analyzer for real-time frequency analysis of the vibration signals whose components can be located in one location or multiple locations. The vibration signal analyzer 112 includes a signal receiver 202 for receiving the vibration signals from vibration transducer 110. The signal receiver 202 converts the vibration signals into digital data that is sent to a processing unit 204 for further processing. Processing unit 204 is responsible for executing the software instructions and performing the calculations required for the real-time analysis. In one aspect, the processing unit 204 uses Fast Fourier Transform (FFT) or similar techniques to analyze and process the data and convert it into a frequency-domain response or frequency spectrum. The vibration signal analyzer 112 further includes a Memory 206 for storing the vibration signals and the processed vibration data, and a display 208 for visually representing the frequency-domain response. In one aspect, the display 208 can be a built-in screen, such as an LCD or LED panel, where the graphical representation of the frequency spectrum is shown. In another aspect, the vibration signal analyzer 112 may connect to an external display device, such as a computer monitor, for a larger and more detailed view.

The vibration signal analyzer 112 may also include a user interface 210 that allows users to interact directly with the device and make real-time adjustments. The user interface 210 may include physical controls or buttons for adjusting various parameters and settings including frequency range selection, input gain adjustment, resolution bandwidth settings, display preferences, and other related parameters. A power supply 212, provides power to the vibration signal analyzer 112. The power supply 212 can be either built-in as an internal component or an external component, such as a power adapter. In one aspect, the vibration signal analyzer 112 can operate on battery power, providing portability and flexibility in usage.

In operation, the vibration signal analyzer 112 digitizes the vibration response or signal obtained from the vibration transducer 110 and converts it into a time-domain data with a series of data points that represent the signal's amplitude at different points in time. A Fourier transform algorithm is applied by the processing unit 204 to convert this time-domain data into the frequency domain to produce a spectrum of the signal's amplitude at different frequencies. The frequency spectrum can be examined to identify the frequency or frequencies at which the vibration response associated with the service pipe 114 is the highest, which is illustrated as peaks in the frequency spectrum. These represent the resonant frequencies of the service pipe material. The type of material or composition of the service pipe 114 can be determined by identifying the peaks in the frequency spectrum and comparing with the resonant frequencies of known or predetermined service pipe materials, including lead, copper, and galvanized steel. For instance, the resonant frequencies of lead and copper service pipes differ significantly so as to allow identification of the service pipe material by comparing the resonant frequencies. It should be understood that the resonant frequencies of service pipes can depend on a variety of factors including pipe material, pipe diameter, pipe wall thickness, variations in cross-sectional wall thickness, and soil ground characteristics. In one aspect, an initial step would involve conducting measurements on known materials of pipes in an area or a utility to predetermine resonant frequencies corresponding to different known service pipe materials. In another aspect, the resonant frequencies of different service pipe of known configurations could be predetermined by testing and stored for retrieval at a later date for use in the operation described herein. Such storage may, for example, take the form of a database or a lookup table created through repeated measurements carried out on service pipes of known configurations including different materials, sizes, diameters, thicknesses, densities, and so on.

It should be noted that the resonant frequency value of the service pipes will vary due to manufacturing tolerances or allowable variations in the physical dimensions of the service pipes that can occur during the manufacturing process. However, the resonant frequencies can be estimated through a combination of physical modelling to determine the first three wavenumber results (or the first three resonant frequencies or modes of vibration). The estimated resonant frequencies can then be confirmed using data obtained in the field over a large number of service pipes in different locations. The resonant frequencies are typically well below the ring frequency (frequency at which the wavelength of the wave in the pipe equals it circumference) of the pipe, and can be described with closed form solutions using the Kennard shell equations described in J. M. Muggleton et al., Wavenumber prediction of waves in buried pipes for water leak detection, *Journal of Sound and Vibration* (2002) 249 (5), 939-954, which is hereby incorporated by reference in its entirety. For instance, while the resonant frequency for copper can be solved by assuming a thin-walled shell, a thick-walled solution is required for lead pipes.

In another aspect, the type of material of the service pipe 114 can be identified by determining the damping response of the pipe system when the excitation sound is stopped. The damping factor, also known as the damping ratio, quantifies the degree to which vibrations in the service pipe 114 decrease over time. The damping factor can be calculated from the vibration response by using the logarithmic decrement method which utilizes the decay of successive peaks in the response to calculate the damping factor. The logarithmic decrement ($\xi$) can be calculated using the formula:

$$\xi = (1/n) * \ln(A1/A2)$$

where n is the number of cycles between the peaks, and A1 and A2 are the amplitudes of two successive peaks in the time-domain vibration response.

The damping ratio ($\xi$) can be calculated from the logarithmic decrement by the following equation:

$$\zeta = \xi/(2\pi * sqrt(1 + \xi^{\wedge}2))$$

Different materials will have different damping characteristics or damping factors depending on their physical properties, such as elasticity and internal friction. For instance, lead service pipes will have a higher damping factor than copper service pipes. The service pipe material can be identified by comparing the measured damping factor for the service pipe 114 with known values for different materials.

Damping of the system can also be assessed by determining the Q-factor for the service pipe 114. The Q-factor describes the damping of the resonating pipe, or, equivalently, characterizes the pipe's bandwidth relative to its center frequency. The formula for Q-factor (Q) in a simple harmonic oscillator is:

$$Q = \text{(Resonant frequency)/(Bandwidth)}$$

where the resonant frequency is the frequency at which the system naturally vibrates, and the bandwidth is the range of frequencies over which the system significantly responds.

In terms of damping, Q can also be represented as:

$$Q = 1/(2 * \text{Damping Factor})$$

The Q-factor and damping factor are inversely related. A system with a high Q-factor has a low damping factor, and vice versa.

The Q-factor is represented by the sharpness of the resonant curve can be obtained by measuring the excitation response at the resonant frequency, and frequencies at 2% of the total bandwidth both above and below the resonant frequency to a total of 10-15% of bandwidth. For example, for a resonant frequency of 1000 Hz, frequencies at 20 Hz intervals 1020, 1040, 1060, and so on, above and below resonance can be measured. The system damping can then be determined by observing the decay characteristics of the service pipe 114 when excited at resonance as measured using the one or more vibration transducers 110.

In still another aspect, damping of the system can be determined through the presence of vibration harmonics as measured on the ground, which manifest as multiples of the resonant excitation frequency. The type of material of the service pipe 114 can be identified by detecting the presence or absence of harmonics in the excited service pipe 114. When the vibration exciter 108 generates controlled vibrations, the service pipe 114 vibrates at certain frequencies determined by the physical properties of the service pipe 114. These natural frequencies of vibration are called the harmonic frequencies or just harmonics of the system. Harmonic frequencies are integer multiples of a fundamental frequency. For example, if the system has a fundamental frequency or first harmonic of 100 Hz, the second harmonic would be 200 Hz, the third harmonic would be 300 Hz, and so on. The relative strength or prominence of the harmonics differs depending on the material of the service pipe 114. If a material has high internal damping, the harmonics will die out more quickly, and the material will not ring or resonate as much when it's excited. Conversely, if a material has low internal damping, the harmonics will be more sustained, and the material will tend to ring or resonate more. For instance, lead service pipes have high internal damping, and consequently have low or negligible harmonics. In contrast, copper service pipes have low internal damping, and therefore the presence of harmonics can be detected in copper service pipes.

In one aspect, vibration response measured by the one or more vibration transducers 110 and the processed vibration data generated by the vibration signal analyzer 112 may be sent to a remote database 214 for storage and further analysis. The vibration data for each service pipe can be associated with a postal address and the data can be analyzed to determine whether the service pipe material at a particular postal address has been identified.

Figure 3A:
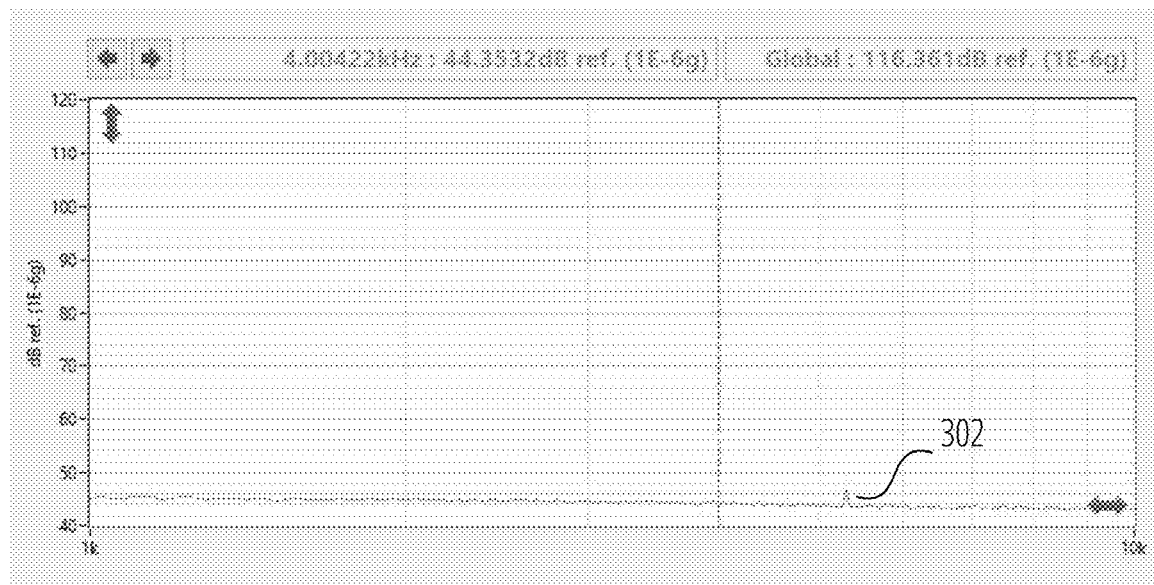
FIG. 3A illustrates a resonant frequency response for a lead service pipe according to one aspect.
Figure 3B:
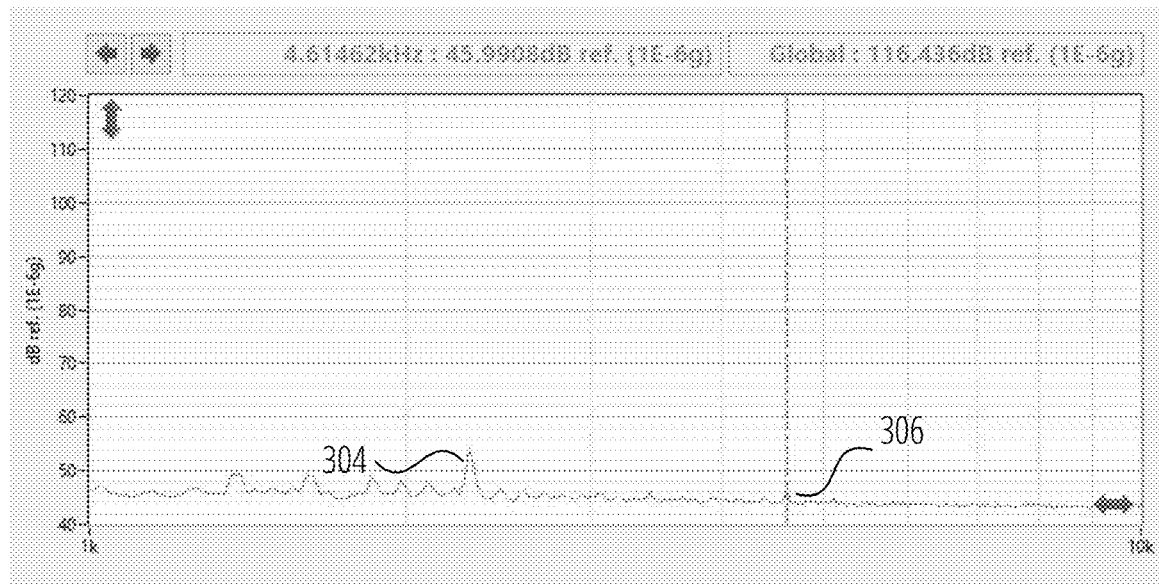
FIG. 3B illustrates a resonant frequency response for a copper service pipe according to one aspect.

FIGS. 3A and 3B illustrate frequency-domain responses showing resonant frequency peaks for a lead service pipe and a copper service pipe, respectively. As discussed above with regard to FIGS. 1B and 2, controlled vibrations were generated in the service pipe and the vibration response associated with the service pipe was measured by a vibration transducer positioned on the ground above the service pipe. A vibration signal analyzer was used to analyze and process the vibration response from a time-domain response to a frequency-domain response using a Fast Fourier Transform (FFT) algorithm. The resultant FFT frequency spectrums are shown in FIGS. 3A and 3B with the x-axis representing the frequency in Hertz (Hz) and the y-axis representing the magnitude or power of each frequency component displayed on a logarithmic scale. The value on the y-axis indicates the strength or intensity of each frequency present in the vibration response, with higher values or peaks on the y-axis indicating stronger frequency components. As shown in FIGS. 3A and 3B, the dominant peaks indicate the resonant frequency of the pipe. The frequency of the dominant peak can be compared to a known set of resonant frequencies corresponding to different service pipe materials including lead, copper, galvanized steel, and plastic, to identify the material of the service pipe. Alternatively, the frequency of the dominant peak can be compared to one or more known or predetermined resonant frequencies corresponding to known materials for service pipes in an area or vicinity of where the analysis is being performed. This may involve an initial step of conducting measurements on known materials of pipes in an area which initial step may be done at any time prior to the analysis being performed.

FIG. 3A shows a dominant peak 302 which represents the resonant frequency of a lead service pipe. FIG. 3B shows a dominant peak 304 that indicates the resonant frequency of a copper service pipe. FIG. 3B also includes a first harmonics peak 306 for the copper service pipe. As illustrated in FIGS. 3A and 3B, the dominant peaks or the resonant frequencies of lead and copper service pipes differ significantly so as to allow identification of the service pipe material by comparing the resonant frequencies.

Figure 4A:
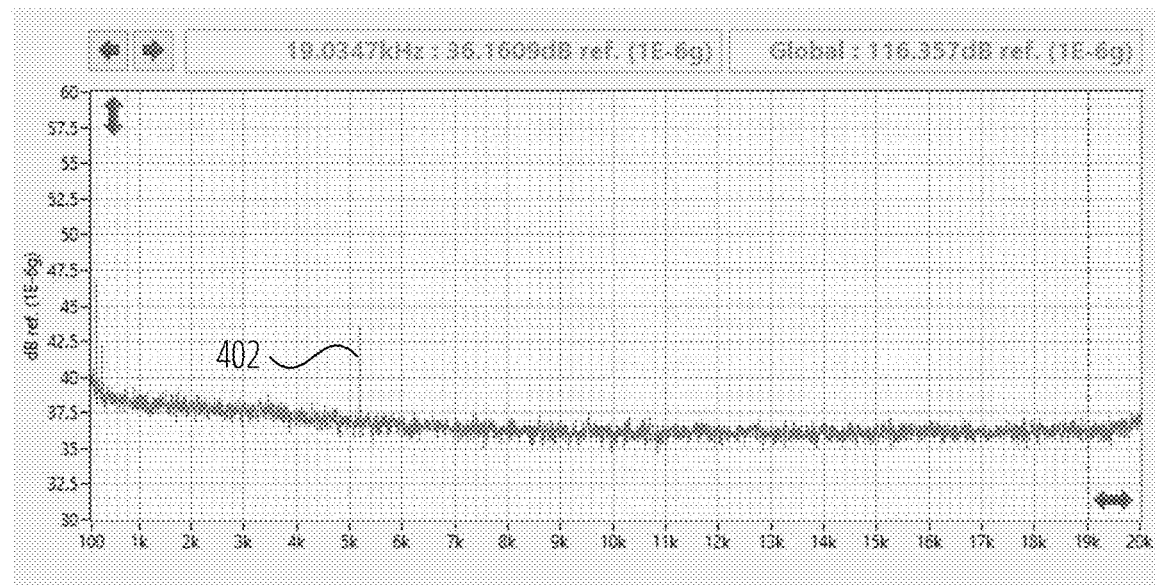
FIG. 4A illustrates a harmonic excitation response for a lead service pipe according to one aspect.
Figure 4B:
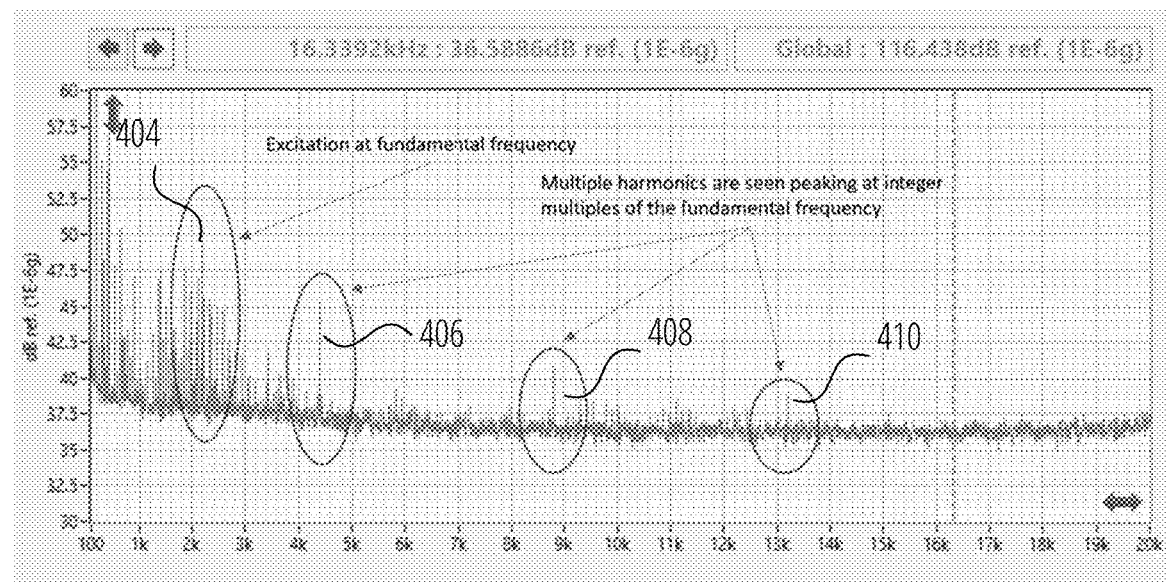
FIG. 4B illustrates a harmonic excitation response for a copper service pipe according to one aspect.

FIGS. 4A and 4B illustrate frequency-domain responses showing the difference in harmonic excitation response between a lead service pipe and a copper service pipe. As discussed above with regard to FIGS. 3A and 3B, the frequency-domain responses are shown in FIGS. 4A and 4B with the x-axis representing the frequency in Hertz (Hz) and the y-axis representing the magnitude or power of each frequency component displayed on a logarithmic scale. The value on the y-axis indicates the strength or intensity of each frequency present in the vibration response, with the dominant peak indicating excitation at the fundamental frequency. Subsequent peaks indicate excitation at harmonic frequencies which are integer multiples of the fundamental frequency. The material of a service pipe can be identified by comparing the harmonic excitation responses of service pipes containing different materials. For instance, lead service pipes have low or negligible harmonics while the presence of harmonics can be detected in the vibration response of a copper service pipe.

FIGS. 4A and 4B highlight the striking difference in vibration responses between lead and copper service pipes, which can be identified by inspecting harmonics. FIG. 4A illustrates the frequency-domain response for a lead service pipe and shows a first excitation 402 at the fundamental frequency with no prominent harmonics being excited. In contrast, FIG. 4B illustrates the frequency-domain response for a copper service pipe and shows a first excitation 404 at the fundamental frequency and multiple harmonic excitations 406, 408, 410 at integer multiples of the fundamental frequency, along with high spectral noise. This difference in the harmonics between lead and copper service pipes are due to the difference in modulus of elasticity of lead and copper. For instance, the modulus of elasticity of lead is 5 to 10 times lower as compared to copper. Another contributing factor to the difference in harmonic responses may be the greater thickness of the lead service pipe as compared to the copper service pipe.

Figure 5:
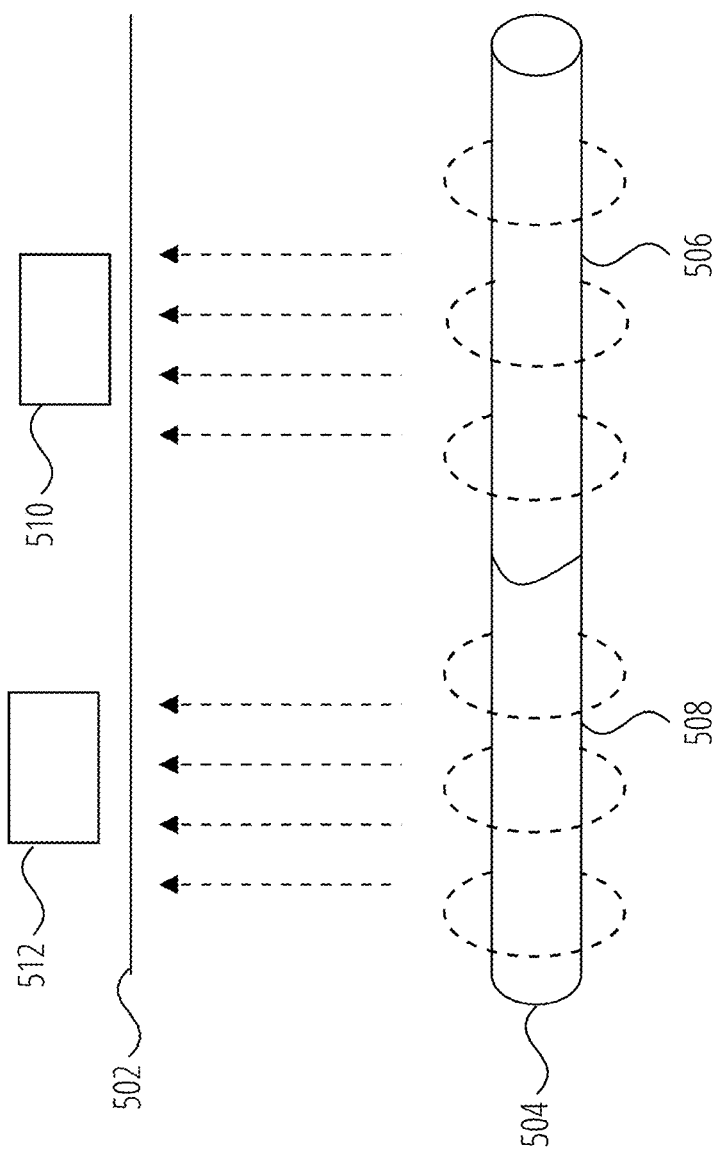
FIG. 5 illustrates a line source vibration response of a service pipe according to one aspect.

FIG. 5 illustrates a line source vibration response of a service pipe according to one aspect. Service pipe 504 is buried below the ground 502, and is made of at least two sections composed of different materials. Service pipes with sections composed of different materials are common and are a result of a partial replacement carried out by either the utility or the homeowner. First section 206 of the service pipe 504 is a lead pipe attached to second section 508 composed of copper. When controller vibrations are transmitted through the service pipe 504, each section will vibrate at particular resonant frequencies depending on the type of material in the section. The wave propagation through the service pipe 504 will be as a "line source", and the vibration of soil from the pipe will be dominated by the material immediately below the soil. The vibration response of each section can be measured by placing a plurality of vibration transducers 510, 512 on the ground 502 in a line directly above the service pipe 504. The material of each of the sections can be identified by the vibration transducer 510, 512 mounted directly above the section. For instance, vibration transducer 510 will identify the section 506 that is directly below it as composed of lead, while vibration transducer 512 will identify the section 208 as composed of copper, based on the measured vibration responses. In one aspect, a plurality of vibration transducers or sensors may be placed in a line, grid, or other pattern corresponding to an expected location of the service pipe. In the embodiment of FIG. 5, a vibration exciter (not shown) similar to that described above may be configured to induce the vibration response in the pipe where an alternative access point to a curb stop is used to excite vibrations in the service pipe 404. In one aspect of this embodiment the ground 502 could be excavated or a hole dug to uncover a portion of service pipe 504 to allow either direct or indirect access to the pipe 504 along its length by the vibration exciter. In a further aspect, the vibration exciter could be located by an end portion of the service pipe so as to be in vibrational communication with the service pipe though an end portion of the service pipe.

Figure 6:
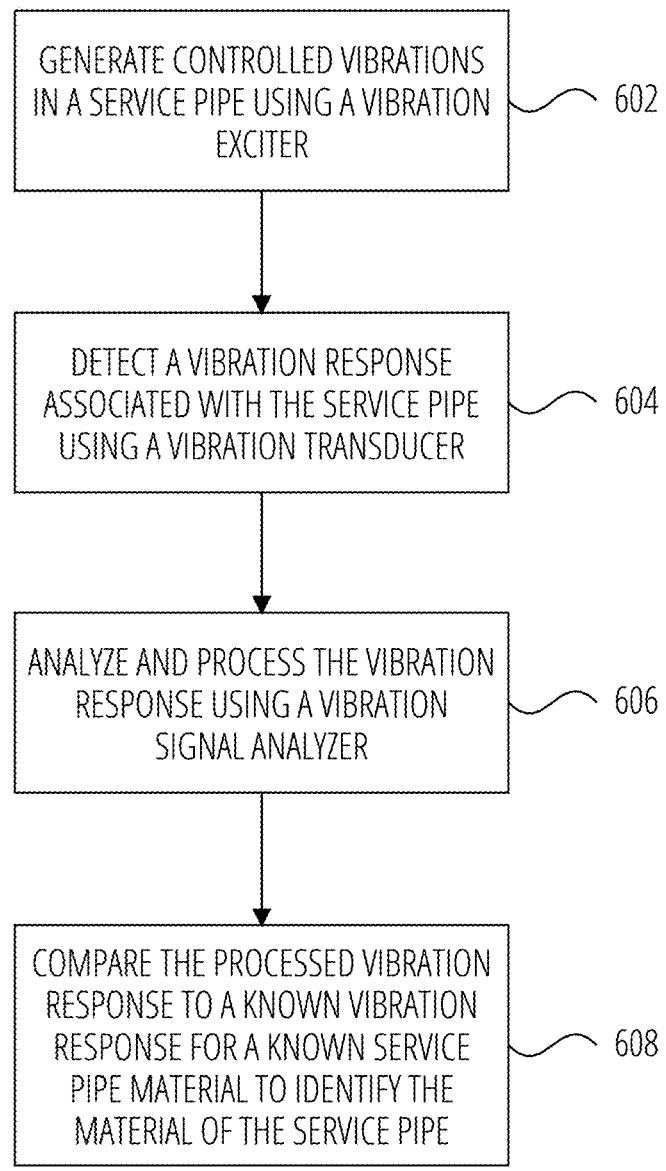
FIG. 6 illustrates a method for identifying service pipe material according to one aspect.

FIG. 6 is a flowchart illustrating a method for identifying service pipe material according to one aspect. A service pipe refers to a water pipe that connects a water main to a curb stop shut-off valve or a water pipe that runs from the curb stop shut-off valve to a house or building. The curb stop shut-off valve, or simply a curb stop, refers to a valve used in a water supply system to control the flow of water from the main water line to a property's service line. This valve is usually located near the property line or curb, and is typically housed in a small enclosure known as a curb box, which is accessible from the surface. The operation of the curb stop shut-off valve generally requires a specialized tool known as a curb stop key or curb stop wrench, which can open or close the valve. The curb stop key is long enough to reach down into the curb box (which can be several feet deep) and turn the curb stop shut-off valve without needing to excavate it. Newer curb stop shut-off valves have riser rods which are permanently connected to the curb stop shut-off valve at depth, thereby reducing the depth that needs to be accessed via the curb stop key to, for instance, 1 foot.

A first step of the method for identifying a material of the service pipe 114 as illustrated in FIG. 6 includes generating controlled vibrations in the service pipe 114 pipe using a vibration exciter 108 (block 602). The vibration exciter 108 is positioned in vibrational communication to the curb stop shut-off valve 104 and or the service pipe 114, 504 to generate controlled vibrations. In one aspect, the vibration exciter 108 generates the controlled vibrations at the curb stop shut-off valve 104 through a curb stop key 106 coupled to the curb stop shut-off valve 104. The controlled vibrations can either be a series of discrete frequencies or a swept sine wave that continuously increases in frequency from 200 Hz to 10000 Hz. When a frequency at which the service pipe vibrates from the controlled vibrations is substantially equal to a natural frequency of the material of the service pipe 114, the service pipe 114 will resonate at that frequency.

Next, the vibration response of the service pipe 114 can be detected and measured using one or more vibration transducers 110 in vibrational communication with the curb stop shut-off valve 104 and the service pipe 114 (block 604). In one aspect, the vibration exciter 108 is turned off prior to the vibration transducer 110 detecting the vibration response at the curb stop shut-off valve 104. In another aspect, the one or more vibration transducers 110 are mounted on the ground above the service pipe, and the one or more vibration transducers 110 detect the vibration response associated with the service pipe 114 through the ground 118.

In a next step, the vibration response measured by the vibration transducer 110 is sent to a vibration signal analyzer 112 for analyzing and processing the response in real-time (block 606). In one aspect, analyzing and processing the vibration response comprises calculating at least one of a resonant frequency, a damping factor, a Q-factor, and harmonics of the water pipe.

In a next step, the processed vibration response is compared to a known or predetermined vibration response for one or more known service pipe materials to identify the material of the service pipe (block 608). Comparing the vibration response can include comparing at least one a resonant frequency, a damping factor, a Q-factor, and harmonics of the water pipe with that of a service pipe of a known material or a known configuration. It should be understood that the vibration response of service pipes can depend on various factors including pipe material, pipe diameter, pipe wall thickness, variations in cross-sectional wall thickness, and soil ground characteristics. In one aspect, an initial step would involve conducting measurements on known service pipes in an area or a utility to determine vibration responses corresponding to different known service pipe materials including lead, copper, galvanized steel, and plastic. In another aspect, the vibration responses of different service pipes of known configurations could be predetermined by testing and stored for retrieval at a later date for use in the method for identifying service pipe material described herein. Such storage may, for example, take the form of a database or a lookup table created through repeated measurements carried out on service pipes of known configurations.

In one aspect, identifying the material of the service pipe comprises comparing the resonant frequency of the service pipe to a known resonant frequency of a known service pipe material or a known set of resonant frequencies corresponding to different known service pipe materials. For instance, the resonant frequencies of lead and copper service pipes differ significantly so as to allow identification of the service pipe material by comparing the resonant frequencies. In one aspect, an initial step would involve conducting measurements on known pipes in an area or a utility to determine resonant frequencies corresponding to different known service pipe materials including lead, copper, galvanized steel, and plastic.

In another aspect, identifying the material of the service pipe comprises comparing the damping factor of the service pipe to a known damping factor of a known service pipe material. In still another aspect, identifying the material of the service pipe comprises comparing the harmonic response of the service pipe to a known harmonic response of a known service pipe material. In another aspect, identifying the material of the service pipe comprises comparing the Q-factor of the service pipe to a known Q-factor of a known service pipe material.

The method described above is especially useful for identifying lead service pipes in a utility, which can then be replaced to eliminate lead contamination in water. The lead service pipes can be replaced with service pipes made of copper, polyvinyl chloride, or other suitable materials to provide safe portable water to the community.

It should be understood that the embodiments disclosed herein have the advantage that access to the inside of the house or building is not required because the vibration response measurements are taken outside the house or building. With the placement of transducers or sensors on the ground along the pipe for detecting the vibration response, the present embodiments can determine the material of the pipe without any delays that would be associated with getting permission from the owner or occupants for gaining access to the inside of the house or building. Further, the use of a portable field set-up including a plurality of transducers that can be placed in any grid or pattern on the ground allows for accurately detecting a water service pipe having multiple sections of different materials and the relative position of those sections without having to excavate or expose the service pipe. Using the non-intrusive acoustic wave analysis method for identifying service pipes containing lead as disclosed herein, a utility can undertake the identification of lead pipes to readily and proactively build a scaled replacement program for lead water pipes in the community.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result, but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A method for identifying a material of a water pipe buried below ground wherein the water pipe is connected to a curb stop shut-off valve, the method comprising:
generating controlled vibrations in the water pipe through the curb stop shut-off valve using a vibration exciter;
detecting a vibration response associated with the water pipe in response to the controlled vibrations using a vibration transducer in vibrational communication with the water pipe;
analyzing and processing the vibration response using a vibration signal analyzer; and
identifying the material of the water pipe based on a comparison of the processed vibration response of the water pipe to a known vibration response of a known water pipe material.

2. The method of claim 1, further comprising turning off generation of controlled vibrations prior to the vibration transducer detecting the vibration response associated with the water pipe at the curb stop shut-off valve.

3. The method of claim 1, wherein the vibration transducer is mounted on the ground above the water pipe, and wherein the vibration transducer detects the vibration response associated with the water pipe through the ground.

4. The method of claim 3, wherein the vibration transducer is one of a plurality of vibration transducers spaced apart and positioned on the ground above the water pipe along a length thereof.

5. The method of claim 1, wherein the controlled vibrations are generated through a curb stop key coupled to the curb stop shut-off valve.

6. The method of claim 5, wherein the vibration transducer is positioned above ground and is coupled to the curb stop key, and wherein the vibration transducer detects the vibration response associated with the water pipe through the curb stop key.

7. The method of claim 1, wherein the water pipe material comprises at least one of lead, copper, galvanized steel, and plastic.

8. The method of claim 1, wherein analyzing and processing the vibration response comprises identifying at least one of a resonant frequency, a damping factor, a Q-factor, and harmonics of the water pipe.

9. The method of claim 1, wherein analyzing and processing the vibration response comprises:
converting the vibration response from a time-domain response to a frequency-domain response by applying a Fourier transform algorithm;
analyzing the frequency-domain response to identify at least one dominant peak; and
identifying a frequency associated with the at least one dominant peak as a resonant frequency of the water pipe; and
wherein identifying the material of the water pipe comprises comparing the resonant frequency of the water pipe to a known resonant frequency of the known water pipe material.

10. The method of claim 1, wherein identifying the material of the water pipe is based on a comparison of a harmonic excitation response of the water pipe with a known harmonic excitation response of the known water pipe material.

11. The method of claim 1, wherein the water pipe is configured to supply water from a water main to a building, wherein the water pipe is located between the water main and the building.

12. A system for identifying the composition of service pipes buried below ground for supplying water from a water main to a building, the service pipe being connected to a respective curb stop shut-off valve, the system comprising:
a vibration exciter configured to generate controlled vibrations through the curb stop shut-off valve and into the service pipe;
at least one vibration transducer configured to detect a vibration response associated with the service pipe in response to the controlled vibrations; and
a vibration signal analyzer coupled to the at least one vibration transducer and configured to analyze and process the vibratory response, and further configured to identify a material of the service pipe based on a comparison of the processed vibration response of the service pipe with a known vibration response for a known service pipe material.

13. The system of claim 12, wherein a curb stop key is coupled to a curb stop shut-off valve, and the vibration exciter is configured to generate the controlled vibrations through the curb stop key coupled to the curb stop shut-off valve.

14. The system of claim 13, wherein the at least one vibration transducer is positioned above ground and is coupled to the curb stop key, and wherein the at least one vibration transducer detects the vibration response associated with the service pipe through the curb stop key.

15. The system of claim 14, wherein the vibration exciter is configured to turn off generation of controlled vibrations prior to the at least one vibration transducer detecting the vibration response associated with the service pipe at the curb stop shut-off valve.

16. The system of claim 12, wherein the at least one vibration transducer is mounted on the ground above the service pipe, and wherein the at least one vibration transducer detects the vibration response associated with the service pipe through the ground.

17. The system of claim 16, wherein a curb stop key is coupled to the curb stop shut-off valve and the vibration exciter is configured to generate the controlled vibrations through the curb stop key coupled to the curb stop shut-off valve.

18. The system of claim 12, wherein analyzing and processing the vibration response comprises identifying at least one of a resonant frequency, a damping factor, a Q-factor, and harmonics of the service pipe.

19. The system of claim 12, wherein the vibration signal analyzer is configured to:
convert the vibration response from a time-domain response to a frequency-domain response by applying a Fourier transform algorithm;
analyze the frequency-domain response to identify at least one dominant peak; and
identify a frequency associated with the at least one dominant peak as a resonant frequency of the service pipe; and
wherein identifying the material of the service pipe comprises comparing the resonant frequency of the service pipe to a known resonant frequency of the known service pipe material.

20. A method for identifying a material of a water pipe buried below ground wherein the water pipe is connected to a curb stop shut-off valve, the method comprising:

generating controlled vibrations in the water pipe through the curb stop shut-off valve using a vibration exciter;

detecting a vibration frequency response directly from the water pipe in response to the controlled vibrations using a vibration transducer in vibrational communication with the water pipe;

analyzing and processing the vibration frequency response using a vibration signal analyzer, wherein analyzing and processing the vibration frequency response comprises identifying at least one of a resonant frequency, a damping factor, a Q-factor, or harmonics of the water pipe; and identifying the material of the water pipe based on a comparison of the processed vibration frequency response of the water pipe to a known vibration frequency response of a known water pipe material.

* * * * *